(12) United States Patent
Roberson et al.

(10) Patent No.: US 9,013,322 B2
(45) Date of Patent: Apr. 21, 2015

(54) REAL-TIME ONSITE INTERNET COMMUNICATION WITH WELL MANAGER FOR CONSTANT WELL OPTIMIZATION

(75) Inventors: Alan L. Roberson, Cypress, TX (US); Doneil M. Dorado, Missouri City, TX (US); David L. Pinnell, Kingwood, TX (US); Eric S. Oestreich, Richmond, TX (US)

(73) Assignee: Lufkin Industries, LLC, Dallas, TX (US)

( * ) Notice: Subject to any disclaimer, the term of this patent is extended or adjusted under 35 U.S.C. 154(b) by 2434 days.

(21) Appl. No.: 11/733,154

(22) Filed: Apr. 9, 2007

(65) Prior Publication Data

US 2009/0055029 A1 Feb. 26, 2009

(51) Int. Cl.
| | |
|---|---|
| *G01V 3/00* | (2006.01) |
| *G08B 21/00* | (2006.01) |
| *E21B 47/00* | (2012.01) |
| *G05B 23/02* | (2006.01) |

(52) U.S. Cl.
CPC ............. *G05B 23/0267* (2013.01); *G01V 3/00* (2013.01); *G08B 21/00* (2013.01); *E21B 47/00* (2013.01); *G05B 2219/13* (2013.01)

(58) Field of Classification Search
USPC ................... 340/854.4, 679; 702/2, 6, 12, 15
See application file for complete search history.

(56) References Cited

U.S. PATENT DOCUMENTS

| | | | | |
|---|---|---|---|---|
| 4,594,665 A | * | 6/1986 | Chandra et al. | 702/6 |
| 5,227,775 A | * | 7/1993 | Bruckert et al. | 340/7.22 |
| 5,252,031 A | * | 10/1993 | Gibbs | 417/53 |
| 5,331,450 A | * | 7/1994 | Heep et al. | 398/92 |
| 5,589,633 A | * | 12/1996 | McCoy et al. | 417/63 |
| 5,790,977 A | | 8/1998 | Ezekiel | |
| 5,980,090 A | | 11/1999 | Royal, Jr. et al. | |
| 6,134,248 A | * | 10/2000 | Kawasaki et al. | 370/519 |
| 6,343,255 B1 | | 1/2002 | Peek et al. | |
| 6,351,689 B1 | | 2/2002 | Carr et al. | |
| 6,360,137 B1 | | 3/2002 | Royal et al. | |
| 6,411,678 B1 | | 6/2002 | Tomlinson, Jr. et al. | |
| 6,456,902 B1 | | 9/2002 | Streetman | |
| 6,460,622 B1 | | 10/2002 | Rice | |
| 6,498,988 B1 | | 12/2002 | Robert et al. | |
| 6,510,350 B1 | | 1/2003 | Steen, III et al. | |
| 6,519,568 B1 | | 2/2003 | Harvey et al. | |

(Continued)

FOREIGN PATENT DOCUMENTS

RU 2144612 C1 1/2000

OTHER PUBLICATIONS

International Preliminary Report on Patentability of PCT/US2008/059749 dated Oct. 22, 2009.

(Continued)

*Primary Examiner* — Fekadeselassie Girma
(74) *Attorney, Agent, or Firm* — Sutton McAughan Deaver PLLC

(57) ABSTRACT

An apparatus and method for well control and monitoring including an independent web server computer integrated with a pump controller located at each well in an oil field. The well controller locally controls the well pump, processes well and pump data, generates surface and downhole cards, and communicates production reports, recommendations for production improvements, and production statistics to remote sites via the internet. The controller can be queried remotely to provide production reports, etc. Furthermore, the controller can initiate alerts via email, text messaging, or internet messaging, for example, during fault conditions.

19 Claims, 9 Drawing Sheets

(56) References Cited

U.S. PATENT DOCUMENTS

| | | |
|---|---|---|
| 6,546,314 B1 | 4/2003 | Carr et al. |
| 6,578,634 B2 | 6/2003 | Newman |
| 6,611,740 B2 | 8/2003 | Lowrey et al. |
| 6,615,924 B2 | 9/2003 | Rice |
| 6,665,568 B1 | 12/2003 | Hott |
| 6,675,098 B2 | 1/2004 | Peek et al. |
| 6,691,779 B1 | 2/2004 | Sezginer et al. |
| 6,711,512 B2 | 3/2004 | Noh |
| 6,739,840 B2 | 5/2004 | Curry et al. |
| 6,749,017 B1 | 6/2004 | Lu et al. |
| 6,766,854 B2 | 7/2004 | Ciglenec et al. |
| 6,782,294 B2 | 8/2004 | Reich et al. |
| 6,823,239 B2 | 11/2004 | Sieminski |
| 6,834,233 B2 | 12/2004 | Economides et al. |
| 6,851,444 B1 | 2/2005 | Kohl et al. |
| 6,857,474 B2 | 2/2005 | Bramlett et al. |
| 6,864,778 B2 * | 3/2005 | Musschebroeck et al. .. 340/3.41 |
| 6,873,267 B1 | 3/2005 | Tubel et al. |
| 6,898,149 B2 | 5/2005 | Hill et al. |
| 6,900,738 B2 | 5/2005 | Crichlow |
| 6,904,385 B1 | 6/2005 | Budike, Jr. |
| 6,925,335 B2 | 8/2005 | May et al. |
| 6,965,319 B1 | 11/2005 | Crichlow |
| 6,967,589 B1 | 11/2005 | Peters |
| 6,968,905 B2 | 11/2005 | Adnan et al. |
| 7,006,009 B2 | 2/2006 | Newman |
| 7,064,677 B2 | 6/2006 | Newman |
| 7,096,092 B1 | 8/2006 | Ramakrishnan et al. |
| 7,154,410 B2 * | 12/2006 | Hoermann ................. 340/13.27 |
| 7,212,923 B2 | 5/2007 | Gibbs et al. |
| 7,346,455 B2 | 3/2008 | Ward et al. |
| 7,675,429 B2 * | 3/2010 | Cernasov .................... 340/4.11 |
| 2002/0003467 A1 * | 1/2002 | Musschebroeck et al. .. 340/3.41 |
| 2002/0035551 A1 | 3/2002 | Sherwin et al. |
| 2003/0065447 A1 * | 4/2003 | Bramlett et al. .................. 702/6 |
| 2003/0105565 A1 | 6/2003 | Loda et al. |
| 2004/0227656 A1 * | 11/2004 | Asakura et al. ............... 341/176 |
| 2006/0149476 A1 | 7/2006 | Gibbs et al. |
| 2006/0271299 A1 * | 11/2006 | Ward et al. ........................ 702/6 |
| 2007/0063863 A1 * | 3/2007 | Cheng et al. ............ 340/825.69 |
| 2007/0133994 A1 * | 6/2007 | Chi .............................. 398/115 |
| 2009/0091472 A1 * | 4/2009 | Ocondi .................... 340/870.03 |

OTHER PUBLICATIONS

Russian Office Action dated Mar. 10, 2011 from corresponding Russian Patent Application No. 2009140781, 9 pages, together with English translation of same.

Ott, M., copy of office action issued by Canadian Intellectual Property Office in counterpart Canadian Patent Application No. 2,628,660, dated Oct. 24, 2014.

* cited by examiner

REAL-TIME ONSITE INTERNET COMMUNICATION WITH WELL MANAGER FOR CONSTANT WELL OPTIMIZATION

BACKGROUND OF THE INVENTION

1. Field of the Invention

This invention relates generally to methods and apparatus for remotely monitoring, controlling, and automating the operation of pumps for the production of hydrocarbons and dewatering, for example, and more specifically to a controller for rod pumps, progressing cavity pumps, injection well control, variable speed drives, well gas measurement, et cetera, for continuous optimization thereof.

2. Description of the Prior Art

Hydrocarbons are often produced from well bores by sucker rod pumps, reciprocating pumps driven from the surface by pumping units that move a polished rod up and down through a packing gland at a wellhead. The units may be of the predominant beam type or any other type that reciprocates the polished rod.

Because the incremental cost of larger sucker rod pumps is usually less than the added value realized by producing oil from the wells at the highest possible rate, sucker rod pumping units are typically sized to pump faster than the wells can produce. Consequently, sucker rod pumps periodically run out of liquids to pump and draw gas into the cylinders through the standing valves. The term "pumped-off" is used to describe the condition where the fluid level in the well is not sufficient to completely fill the pump barrel on the upstroke. On the next down stroke the plunger will impact the fluid surface in the incompletely filled barrel and send shock waves through the rod string and other components of the pumping system. This "fluid pound" lowers well production efficiency and over time can cause damage to the drive unit or downhole pump, such as broken rods.

To minimize running pumped-off, sucker rod pumps are generally operated with some type of controller. Early controllers consist of simple controllers, such as clock timers that start and stop the pumping unit in response to a user selectable program, allowing the well to fill during the times when the pump is switched off. However, simple clock timers are not responsive to actual well conditions and do not detect actual pump-off conditions.

Thus, in the early 1970s, a viable well control method evolved using more sophisticated controllers that stop the rod pump when a well actually pumps-off. This method is known as pump off control (POC). Over the years, POC has employed different algorithms to sense pump-off conditions. Some of these involve measurement of changes in surface load, motor current, or motor speed.

In addition to running a rod pump in a pumped-off state, other abnormal conditions of the pump operation reduce well production efficiency. Common abnormal conditions include tubing movement, gas interference, an inoperative pump, the pump hitting up or down, a bent barrel, a sticking pump, a worn plunger or traveling valve, a worn standing valve, a worn or split barrel, fluid friction, and drag friction. As many of these problems gradually appear and progressively worsen, early detection of these problems can often minimize the cost of maintenance, minimize the cost of inefficient operation, and prevent or minimize the loss of production.

Traditionally, troubleshooting and repair of pump problems requires lifting the entire down-hole unit to the surface. It is not unusual to have a mile or more of sucker rods or tubing that must be lifted and disassembled by a single or pair of twenty-five or thirty foot long sections at a time. This method of pump diagnosis and troubleshooting is costly both in terms of labor costs and lost revenue from the well.

Fortunately, many pump health indications and abnormal operating conditions can be detected by accurate monitoring of the pump operation, reducing the need for physical inspection of the downhole pump components and lowering the cost of well troubleshooting. Thus, from its humble beginning of merely stopping the well to prevent the mechanical damage of fluid pound and the inefficiency associated with operating an incompletely filled pump, POC has evolved in the last quarter century into a diagnostic system with robust well management capabilities. Gradually the phrase "pump off control" has been replaced with terms like "well manager," "rod pump controller," et cetera. (Lufkin Automation uses the trademark SAM® Well manager to identify its rod pump control system.) These newer terms connote more than pump off control. The later systems generally include diagnostic capability and collection and analysis of performance data for operation of the well in an economic fashion.

Many of these intelligent well controllers monitor work performed, or something that relates to work performed, as a function of polished rod position. This information is used, for example, to determine if the well is in a pumped-off condition, if valves are leaking or stuck, or for troubleshooting a wide variety of other problems. This information is generally presented and analyzed in the form of a plot of polished rod load versus polished rod position as measured at the surface. For a normally operating pump, the shape of this plot, known as a "surface card" or "surface dynagraph," is generally an irregular elliptical shape. The area bounded by this curve, often referred to as the surface card area, is proportional to the work performed by the pump. Many pump-off controllers utilize a surface dynagraph plot to determine when the sucker rod pump is not filling to shutdown the pump for a time period. For example, U.S. Pat. No. 3,951,209, issued Apr. 20, 1976 to Gibbs, describes a controller that measures at the surface both the load on the rod string and the displacement of the rod string to determine a pump-off condition and is incorporated herein by reference.

However, because the surface card is not always an accurate representation of the load and displacement of the downhole rod string, particularly for deep wells, more accurate well control is achieved by using a "downhole card," i.e., a plot of load versus rod string displacement as measured at the downhole pump. The downhole card is immensely useful. Its shape reveals defective pumps, completely filled pumps, gassy or pounding wells, unanchored tubing, parted rods, etc. Furthermore, the downhole card can be used to sense tubing leaks. Quantitative computation of pump leakage from downhole cards is described in "Quantitative Determination of Rod-Pump Leakage with Dynamometer Techniques," Nolen, Gibbs, SPE Production Engineering, August 1990.

When first developed in 1936, the downhole pump card was directly measured by a dynamometer located at the subsurface pump. The measured data was retrieved by the costly process of pulling the rods and pump. Because even today these measurements are not easily directly obtained, requiring a costly telemetry system to relay the data to the surface, methods have been developed to calculate the downhole dynagraph from the more easily obtained surface card. One such method is described in U.S. Pat. No. 3,343,409 (Gibbs), which is incorporated herein by reference. Gibbs utilizes surface measurements of load and position of the rod string to construct a downhole pump card; to produce the downhole card, solutions to a wave equation to satisfy dynamometer time histories of surface rod load and position are calculated by the use of a computer.

In addition to identification of abnormal well conditions or pump malfunctions, the most advanced of today's well managers can also infer well production rates with considerable accuracy by using the subsurface pump as a flow meter and the downhole card to compute producing pressure, liquid and gas throughput, and oil shrinkage effects. In other words, production rates can be determined continuously without the use of traditional metering equipment or production tests. For example, a decline in production rate can corroborate a mechanical problem indicated by a downhole card; the downhole pump may be worn or a tubing leak may have developed. The decline may also be caused by a change in reservoir conditions in the drainage area of the well; the receptivity of an offset injection well may have diminished, which may have resulted in a producing pressure decline and a decrease in production rate. Conversely, an increase in productivity as calculated by a well manager may indicate that the well is responding to secondary recovery efforts; the well should be pumped more aggressively to obtain the increased production that is available. These sophisticated well managers are instrumental in many facets of oil production including economic operation of the oilfield as a business venture, compliance with governmental regulations, well troubleshooting, and estimation of reservoir reserves. A method of inferred production using a well manager is taught by Gibbs in co-pending U.S. patent application Ser. No. 10/940,273, which is incorporated herein by reference.

Of significant use is the ability of well managers to communicate with a central host computer for supervisory control and data acquisition (SCADA). For example, a well manager unit receives surface rod and load information (or equivalent measurements), measures a surface card, computes a downhole card, and locally displays a graphical representation of the surface card and/or the downhole card for the operators' ease and benefit. However, the benefit of the well manager features is diminished when the operator must be present at the well site to see and analyze the well data. A well manager with SCADA capability, on the other hand, can automatically transfer well data to a distantly located control station. SCADA allows information about the subsurface pump, including well and pump performance data, inferred fluid production over time, and surface and downhole cards, to be both displayed locally for manual recording and automatically sent to a distant central location. Furthermore, the SCADA system may be configured to send alarms, allowing problems to be timely announced. Control signals may also be sent from the central control station to the well manager. SCADA capability reduces or eliminates the need for an individual to visit the well site to determine the status at the controller and results in several advantages, including reducing delays in notifying the operator of alert or alarm conditions, increasing the accuracy of the disseminated well manager data, lowering costs of managing oil fields, and minimizing the need for the operator to visit potentially hazardous well sites. Thus, most sophisticated well managers have a built-in SCADA capability to communicate data by radio, hardwire, or telephone. This telemetry capability makes it possible for one or more computers to retrieve data from a controller, obtain status of operations, issue control instructions, monitor for alarms, and develop reports.

Although current SCADA systems provide some remote connectivity between a remote site and a number of well managers in an oil field, they generally employ expensive proprietary hardware and short-range RF radios of low bandwidth. Typical SCADA systems are polling systems that can only interrogate each well a few times each day to retrieve dynamometer and other performance data. Therefore downhole pump cards can on average be reviewed at the central location via SCADA only a few times each day.

Therefore, it is desirable to provide higher data throughput and continuous connectivity to a well manager by exploiting current internet technology. Such technology integrated with today's sophisticated well controllers would allow more well data to be collected at a central location at a lower cost. Several patents address connecting an oilfield to the internet. For example, U.S. Pat. No. 6,857,474 issued to Bramlett et al. on Feb. 22, 2005 shows a rod pump well manager with the capability to display a graphical pump card at a remote output display via an internet link 131 and is incorporated herein by reference. However, Bramlett's teaching is limited to using the internet to remotely display graphical surface and downhole cards; Bramlett does not disclose sending well production reports, statistics, pump diagnostics, alarms, alerts or other data from the well manager to remote users via the internet or receiving control data at the well manager from remote users over the internet.

The method according to U.S. Pat. No. 7,096,092 issued to Ramakrishnan et al. on Aug. 22, 2006 is illustrated in FIG. 1. Ramakrishnan shows a method of managing oil fields including installing oil field sensors (50) on oil wells (60, 61, 62), connecting the sensors (50) to computer controllers (52) disposed at the wells (60, 61, 62) for data collection and data analysis, and connecting a number of local oil field controllers (52) to a central web server (54). Access to oil field data in real time is provided to a remote computer (56) via the internet (1000). Raw data, partially analyzed data, or fully analyzed data is available remotely. The local controllers (52) are programmed with parameters for analyzing the data and automatically determining the presence of anomalies. Upon detecting the occurrence of an anomaly, the local controllers (52) are programmed to notify, via the central web server (54), an operator by email, pager, telephone, et cetera. If no response to the notification is received within a programmed period of time, the local controllers (52) automatically take pre-programmed corrective action. Ramakrishnan does not disclose that the controllers are adapted to control rod pumps or that the controllers calculate downhole and surface cards or infer production.

U.S. Pat. No. 6,967,589 issued to Peters on Nov. 22, 2005 and illustrated in FIG. 2 shows a system for monitoring gas/oil wells with a local monitoring unit (58) located at each well (61, 62), a central field-located relay unit (64) in wireless short range RF communication with a number of monitoring units (58), and a host interface linked (66) with the relay unit (64) via the internet (1000). The monitoring units (58) collect data regarding the status of the gas/oil wells (61, 62) and wirelessly transmit that data to the relay unit (64). The relay unit (64), in turn, connects to a host interface (66) over the internet (1000) and transmits the data. That is, a central fieldwide web-enabled relay unit (64) is used for numerous well monitoring units (58). Each monitoring unit (58) can transmit information on demand or after an alarm condition is sensed. The relay unit (64) can request information from a monitoring unit (58) or respond to a wake up transmission sent to it from either the host interface (66) or a monitoring unit (58). The host interface (66) receives data from the relay unit (58) for providing data to an operator. Peters does not disclose that the well monitors (58) are adapted to control rod pumps or that they calculate downhole and surface cards or infer production.

Also illustrated by FIG. 2, U.S. Pat. No. 6,898,149 issued to Hill et al. on May 24, 2005 shows a data communications system for use with an oil or gas well (60) including downhole well sensors (67) that communicate via a conventional wireless SCADA interface (68) to a local internet server (64) located in the oil field. In other words, a field-wide web server (64) is used for servicing numerous wells. The internet server (64) acts to transmit data logging at remote points for display. Hill does not disclose controllers adapted to control rod pumps or to calculate downhole and surface cards.

Referring to FIG. 3, U.S. Pat. No. 6,873,267 issued to Tubel et al. on Mar. 29, 2005 shows a system for monitoring and controlling hydrocarbon production wells (63, 65) from a first remote location (70) including a surface control and data acquisition systems (72, 74) each with one or more sensors or downhole flow control devices (76, 78). The surface control and data acquisition systems (72, 74) are in satellite communication with a remote controller (80) disposed at a second remote location (82). The remote controller includes an internet web site server for providing access to end users at the first remote location (70) over the internet (1000). The internet server (80) is disposed at a remote location, not locally at each well (63, 65) or at the surface control and data acquisition systems (72, 74). Tubel does not disclose that the system is adapted to control rod pumps or to calculate downhole and surface cards.

Finally, U.S. Pat. No. 6,498,988 issued to Robert et al. on Dec. 24, 2002 shows a technique for centralized processing for design and analysis on a server computer of oilfield engineering data transmitted over the internet from client computers at distributed locations. The data is processed at the remote server computing device and the results are communicated over the internet to the client computing device. Although each remote client computer has internet connectivity, they do not function as internet servers, and the data is not processed locally.

IDENTIFICATION OF FEATURES PROVIDED BY SOME EMBODIMENTS OF THE INVENTION

A primary object of the invention is to provide a well manager for controlling a rod pump with constant and direct internet connectivity and the capability to act as a web server so that the well manager can host a remote user directly via the internet at any time from anywhere in the world to provide the remote operator unlimited access to critical operating data.

Another object of the invention is to provide a well manager that processes well data at the well site and requires little or no post-processing of collected data.

Another object of the invention is to eliminate the need for specialized and proprietary SCADA protocols and hardware connection methods such as direct serial communication, or other polling-style communication methods to provide data to a distant central location.

Another object of the invention is to provide a well manager unit that requires only standard commercial off-the-shelf computer technology.

Another object of the invention is to provide a well manager having a computer with standard network, administration and security features that require no specialized knowledge or training beyond that generally possessed by corporate information technology (IT) personnel to allow the well manager to be easily integrated into existing corporate IT systems.

Another object of the invention is to provide a well manager that runs totally independently of all other managing systems.

Another object of the invention is to provide a well manager that locally generates on-the-fly data processing and reports and displays them on an output display at the well or remotely via the internet.

Another object of the invention is to provide a well manager that communicates with a remote user using standard email alerts, SMS text messages, or other common internet messaging vehicles to provide the remote user with real-time alerts and reports generated directly by the well manager unit, thus eliminating the need for constant well monitoring by personnel and expensive hardware systems.

Another object of the invention is to provide a well manager where all data and settings are accessible via a web interface to reduce support costs by eliminating the requirement for physical presence to troubleshoot or reconfigure the well manager.

Another object of the invention is to provide a well manager that retrieves, stores, organizes, and processes data onsite in real time, providing reports compatible with off-the-shelf software products such as Excel,® Word,® Access,® et cetera.

Another object of the invention is to provide a well manager that runs proprietary software, such as SROD and DIAG, on specific data to determine opportunities for operating improvements and increased efficiencies.

Another object of the invention is to provide a well manager with backwards-compatible SCADA interoperatively.

SUMMARY OF THE INVENTION

The objects identified above, as well as other features of the invention are incorporated in an apparatus and system for control of rod pumped wells including a well manager pump controller that has a computer system with data acquisition and control circuitry for collecting data from and controlling the rod pump. Preferably, the well manager calculates downhole or surface pump cards for pump off control. The computer system provides on-site well data processing and generates a full suite of well and reservoir operational management reports in user-friendly formats from the collected rod pump data to provide analysis, diagnostics and recommendations for optimizing well performance. The computer system also includes a high capacity web server for selectively and securely allowing a remote computer client to access the well manager over the internet to query well data, download processed reports, control the well, and configure the well manager. The well manager can also push reports, alerts, and alarms to a remote operator via email, text messaging or internet instant messaging, for example, during rod pump fault conditions.

In an oil field of multiple wells, each rod pump has an individual and dedicated well manager with an integral web server that is independent of all others. This system eliminates the need for traditional SCADA systems.

BRIEF DESCRIPTION OF THE DRAWINGS

The invention is described in detail hereinafter on the basis of the embodiments represented in the accompanying figures, in which.

DESCRIPTION OF THE PREFERRED EMBODIMENT OF THE INVENTION

Figure 4:
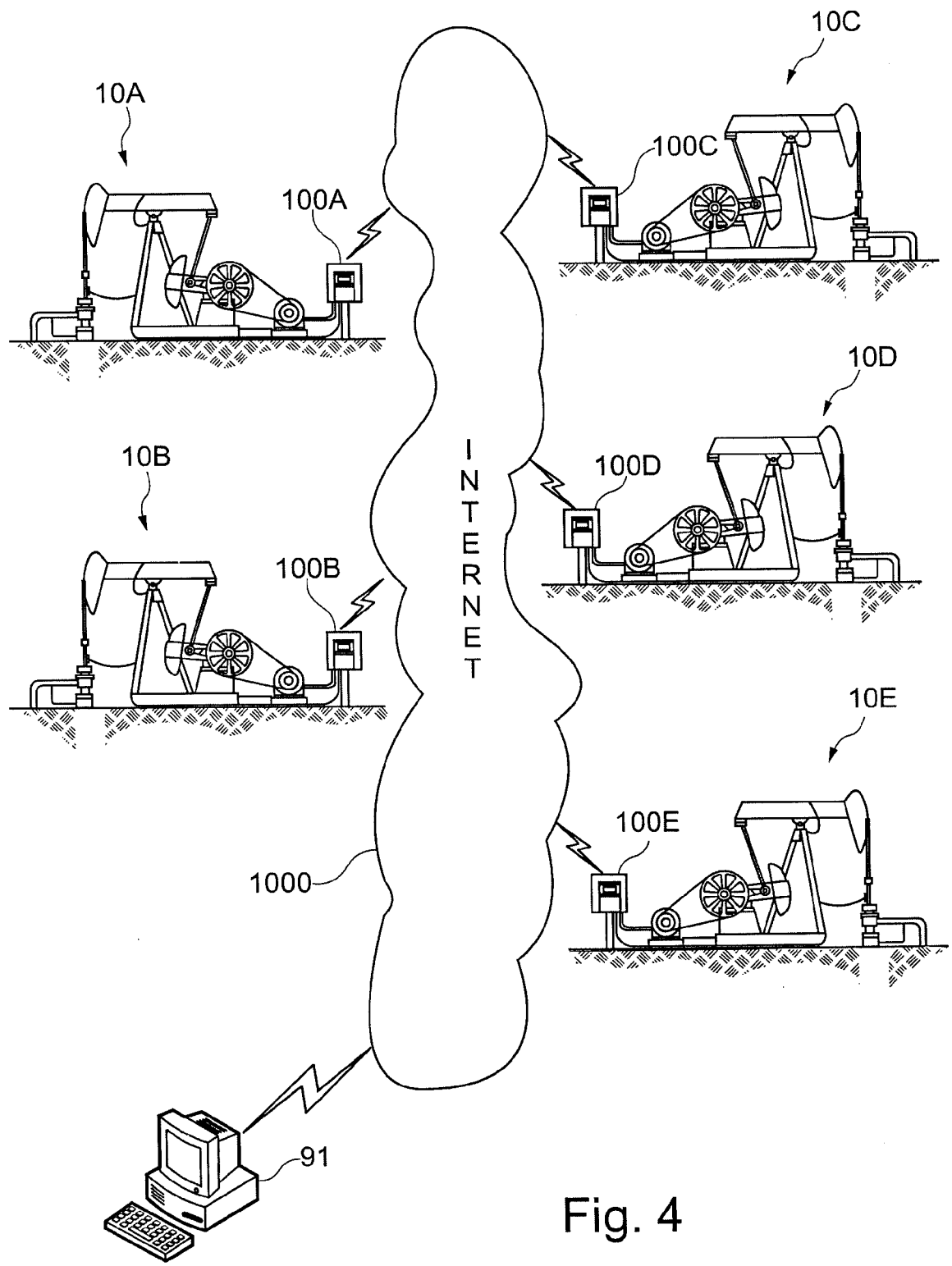
FIG. 4 is a schematic diagram according to a preferred embodiment of the invention illustrating a plurality of rod pumps each with a well manager having an integral web server therein that communicates with a remote client via the internet.

FIG. 4 illustrates a number of rod pumps according to a preferred embodiment of the invention. Rod pumps 10A, 10B, 10C, 10D and 10E are each equipped with a well manager 100A, 100B, 100C, 100D, 100E, respectively. Each well manager 100A, 100B, 100C, 100D, 100E is independent of the others. Well managers 100A, 100B, 100C, 100D, 100E preferably provide pump off control and control the speed of operation of rod pumps 10A, 10B, 10C, 10D, 10E, respectively, to match production rate with well fill rate.

Figure 1:
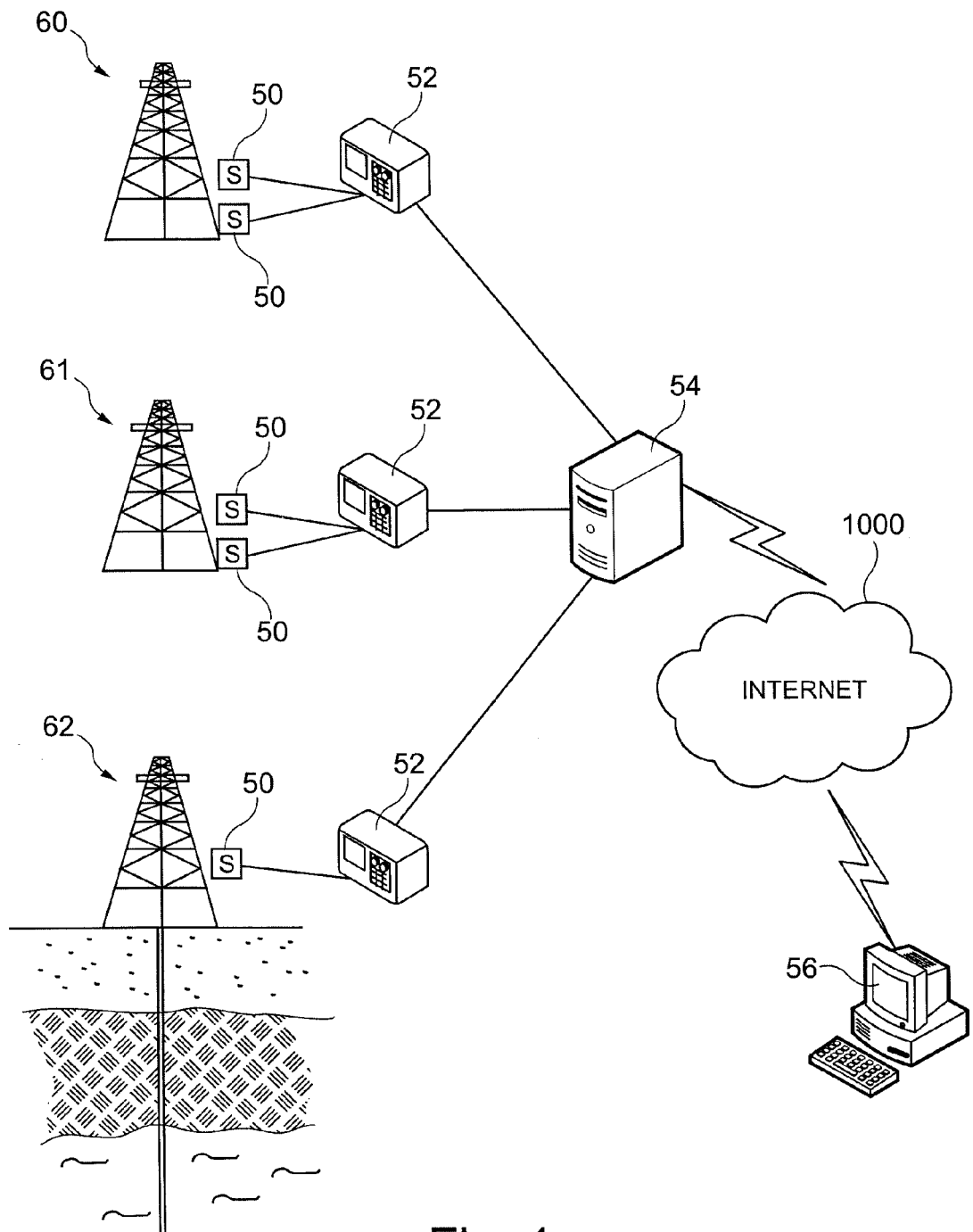
FIG. 1 is a schematic diagram illustrating an arrangement of prior art wherein well sensors are coupled to circuitry disposed locally at the well, with well circuitry for a number of wells in an oil field coupled to a central internet server.
Figure 2:
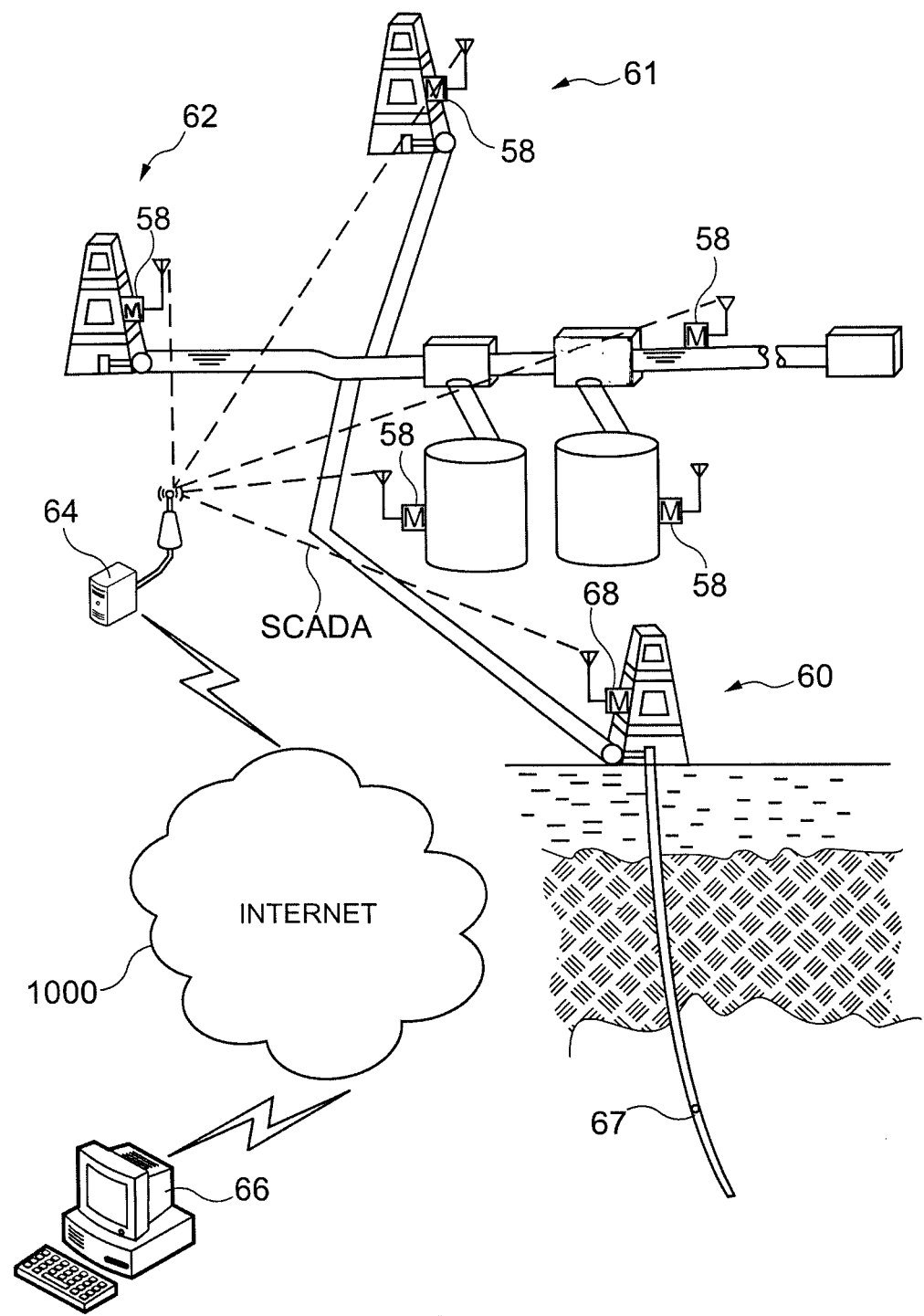
FIG. 2 is a schematic diagram illustrating an arrangement of prior art wherein well sensors are coupled to circuitry locally disposed at the well which transfer data in via wireless RF or SCADA links to a central internet server that serves a multi-well oil field.
Figure 3:
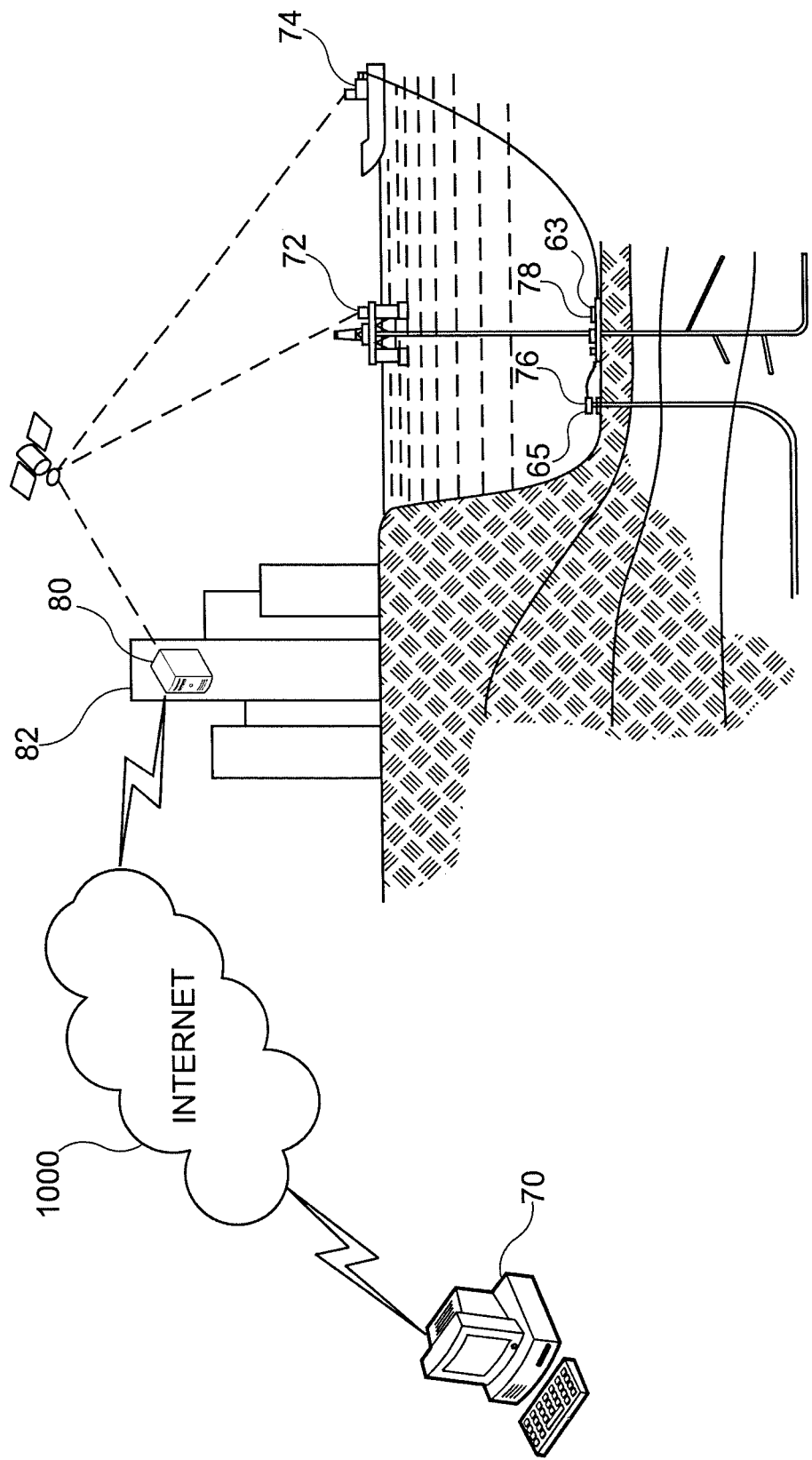
FIG. 3 is a schematic diagram illustrating an arrangement of prior art wherein downhole well sensors communicate with surface control systems, which in turn transmit data via satellite to a remote internet server.

Unlike the prior art arrangements of FIGS. 1-3, each well manager 100A, 110B, 100C, 100D, 100E includes an integrated web server that intelligently handles request from a remote client for well data formatted in Hypertext markup language (HTML) or other user-friendly report formats.

Figure 5:
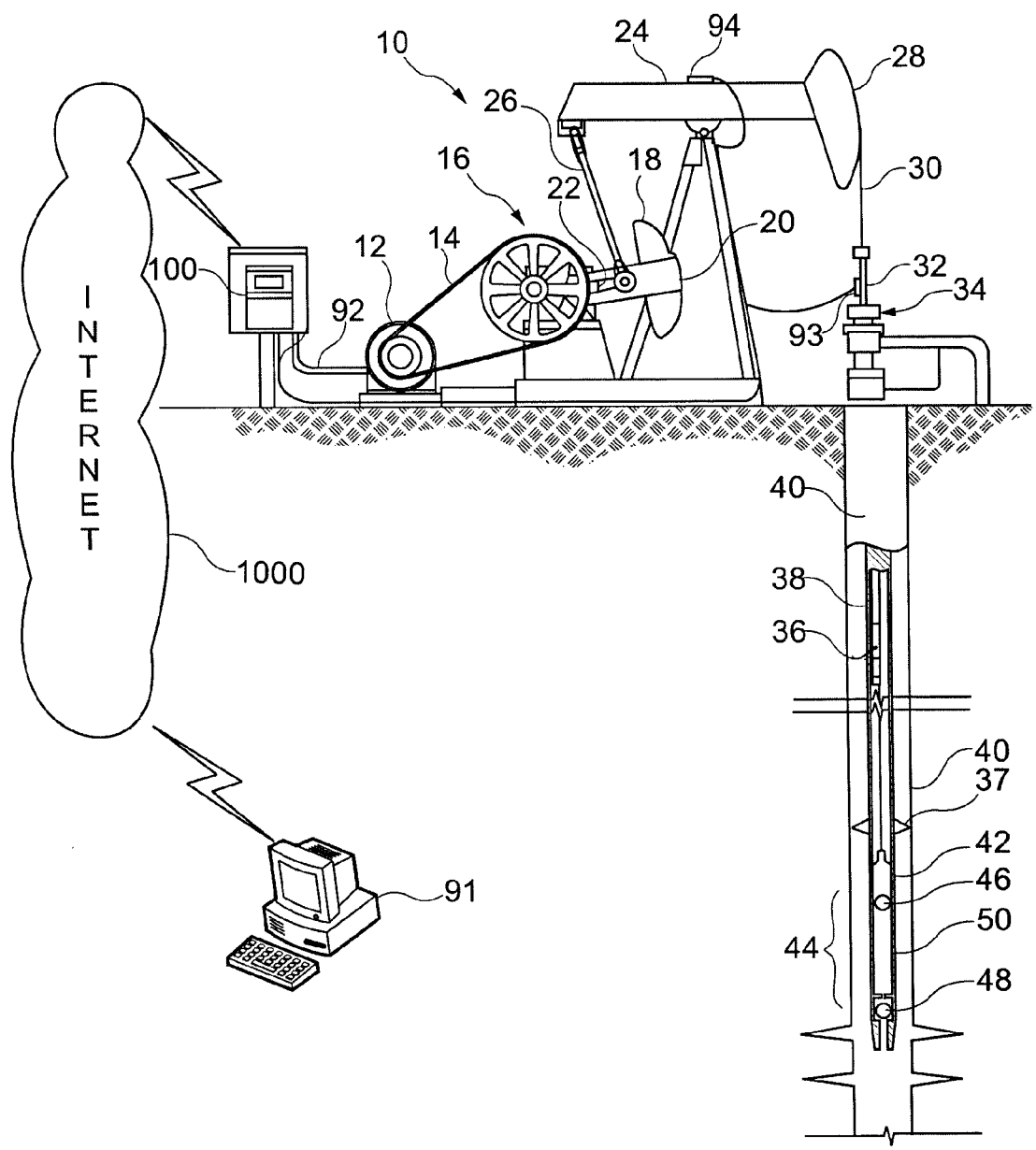
FIG. 5 is a schematic diagram according to a preferred embodiment of the invention illustrating a local well manager adapted for controlling a rod pump and disposed in the vicinity of the well, including an internet server incorporated therein.
Figure 6:
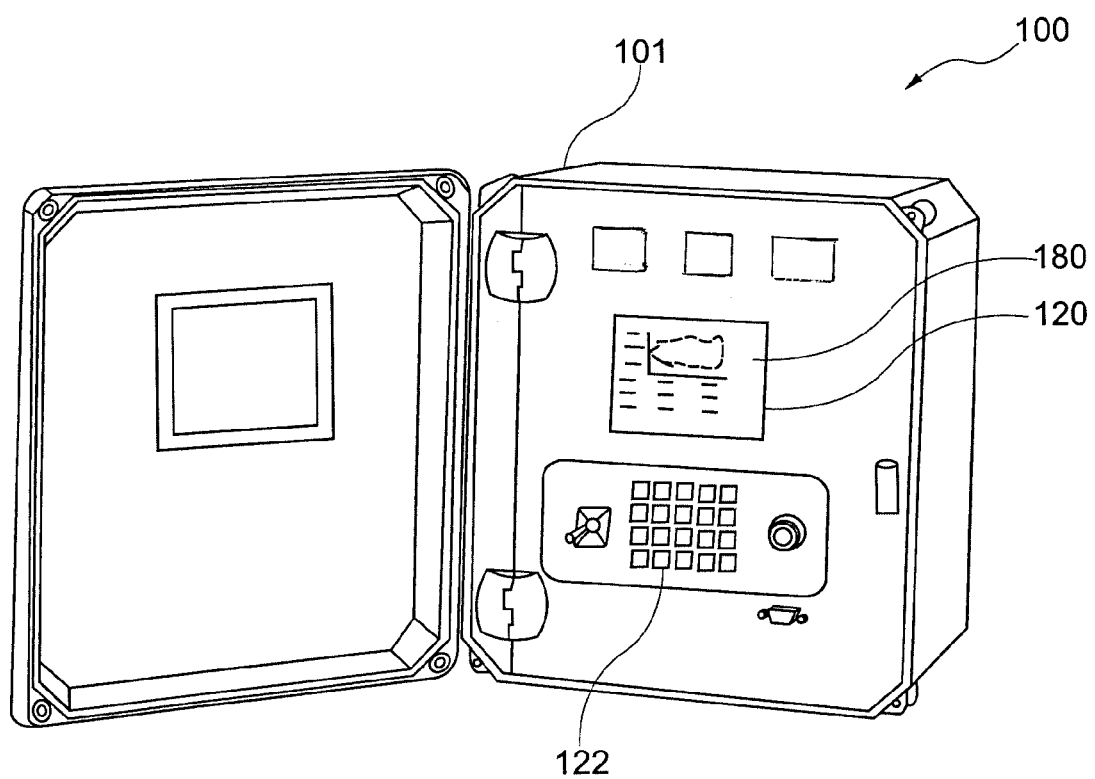
FIG. 6 is a perspective view of a well controller according to an embodiment of the invention showing a computer display screen and input keypad housed in a weathertight enclosure.
Figure 7:
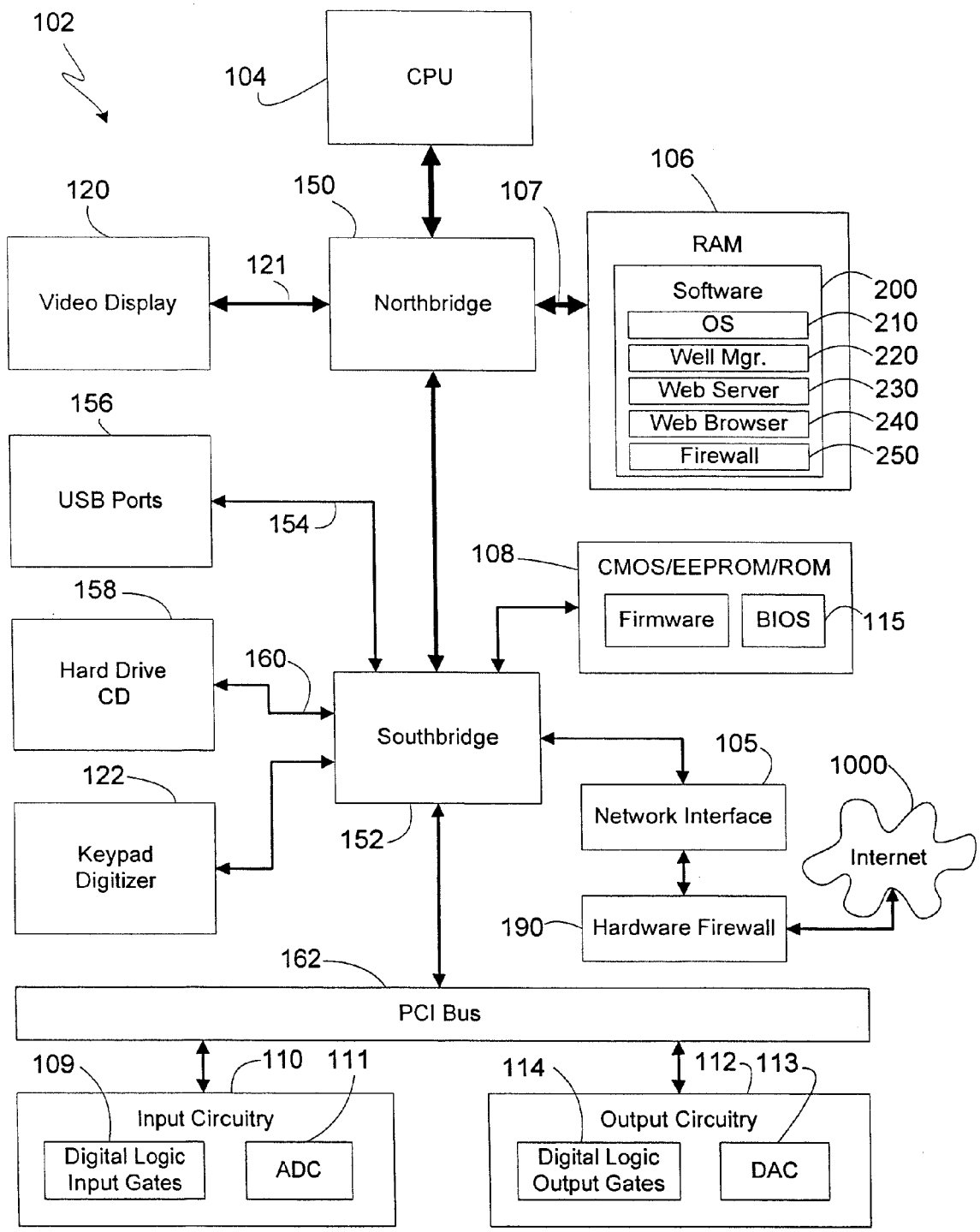
FIG. 7 is a functional schematic diagram of the computer architecture of the well manager according to an embodiment of the invention.

FIGS. 5-7 illustrate a preferred embodiment of the invention. FIG. 5 shows a typical rod pumping system, generally indicated by reference number 10, including a prime mover 12, typically an electric motor. The power output from the prime mover 12 is transmitted by a belt 14 to a gear box 16. The gear box 16 reduces the rotational speed generated by prime mover 12 and imparts a rotary motion to a pumping unit counterbalance, a counterweight 18 and a crank arm 20 that are journaled to a crank shaft end 22 of gear box 16. The rotary motion of crank arm 20 is converted to reciprocating motion by means of a walking beam 24. Crank arm 20 is connected to walking beam 24 by means of a Pitman 26. A walking horsehead 28 and a cable 30 hang a polished rod 32 which extends through a stuffing box 34.

A rod string 36 of sucker rods hangs from polished rod 32 within a tubing 38 located in a casing 40. Tubing 38 can be held stationary to casing 40 by anchor 37. The rod string 36 is connected to a plunger 42 of a subsurface pump 44. Pump 44 includes a traveling valve 46, a standing valve 48 and a pump barrel 50. In a reciprocation cycle of the structure, including the walking beam 24, polished rod 32, rod string 36 and pump plunger 42, fluids are lifted on the upstroke. When pump fillage occurs on the upstroke between the traveling valve 46 and the standing valve 48, the fluid is trapped above the standing valve 48. A portion of this fluid is displaced above the traveling valve 46 when the traveling valve moves down. Then, this fluid is lifted toward the surface on the upstroke.

The prime mover 12 of pumping system 10 is operatively controlled by a locally-disposed well manager 100. Well manager 100 may employ any of a number of pump control methodologies, including control of the prime mover 12 based on surface cards, downhole cards, or motor power. U.S. Pat. No. 3,951,209 issued to Gibbs, which describes pump control by surface cards, and U.S. Pat. No. 5,252,031 issued to Gibbs, which describes pump control by downhole cards, are incorporated herein by reference.

Well manager 100 includes a computer system 102 (FIG. 7). Computer system 102 collects data from and sends control signals to rod pump 10. Computer system 102 also provides on-site well data processing, generating a full suite of well and reservoir operational management reports from the collected rod pump data. Furthermore, computer system 102 functions as a high-capacity web server that hosts a server software application for selectively and securely allowing a remote client computer 91 access to the server over the internet 1000 for transfer of well data and reports. The computer system 102 preferably has the memory capacity and functional capabilities of at least a powerful desktop computer to support a large number of input and control channels, handle data-intensive mathematical computations, and maintain high-throughput internet communications.

Referring to FIG. 6, well manager 100 is ideally equipped with a local display monitor 120 and input keyboard, keypad, and/or input pointing device 122 that are operatively coupled to the computer system 102 for interfacing with a local operator. Well manager 100 is typically incorporated into a single chassis of electronics housed in a weathertight enclosure 101. Well manager may also include a wireless local interface to improve the field operator's efficiency. For example, Bluetooth communication FIG. 7 is a block diagram that illustrates the architecture of a preferred embodiment of the computer system 102, although other architectures may be used as appropriate. Computer system 102 includes a central processing unit (CPU) 104 that is coupled to various buses by a northbridge 150 and a southbridge 152 chipset. CPU 104 is operatively coupled to volatile memory 106 by a high speed memory bus 107 and to a video display 120 by a graphics bus 121 such as an Accelerated Graphics Port (AGP) or a Peripheral Component Interconnect (PCI) Express bus. The memory bus 107 and the graphics bus 121 are directly coupled to the northbridge 150. In other words, they are located on the high-speed front side bus (FSB).

CPU 104 is operatively coupled to a number of other devices or buses on the slower back side bus (BSB), i.e., through the southbridge 152. For instance, keypad 122, non-volatile memory 108, and a network interface 105 are directly tied to southbridge 152. Network interface 105 is preferably an industry standard Transmission Control Protocol over Internet Protocol (TCP/IP)-capable interface that is accessible by hardwire or wireless network communication methods. An optional Universal Serial Bus (USB) 154 connects USB ports 156 to southbridge 152, and an optional hard disk drive or compact disc (CD) 158 is tied to the BSB by an Integrated Drive Electronics (IDE) (also known as Advanced Technology Attachment (ATA)) bus 160. Input and output data acquisition and control circuits 110, 112 are preferably coupled to southbridge 152 by a PCI bus 162. Although not illustrated, computer system 102 includes a power supply with power conditioning circuitry that typically receives line power and supplies low voltage direct current power to the other components of computer system 102.

CPU 104 is preferably a microprocessor or microcontroller, although special-purpose electronic logic circuits may be used. As is well known in the computer field, processor 104 executes software code instructions retrieved from a memory device 106, 108, 158 to interact with a user, control the reception of input data, and access, manipulate, store, transfer and display data on output devices. CPU word size may range from 8 to 64 bits, but computer system 102 is preferably capable of processing words of sufficient size at a sufficient speed so as to accurately and concurrently control the rod pump 10 (FIG. 5), process well data, and perform web server services all in real time.

Memory 106, 108, 158 is used for storing input data, processed data, and software in the form of instructions for the processor. Computer system 102 ideally includes both volatile memory 106 such as random access memory (RAM), which due to its high speed and ease of programming is primarily used to store input data and frequently changing digital control logic software, and non-volatile memory 108 such as battery-backed-up complimentary metal oxide semiconductor (CMOS) memory or electronically erasable programmable read-only memory (EEPROM), which retain memory without power from the computer power supply. CMOS memory and EEPROMs are preferable to store data or software code that is expected to be infrequently changed. Computer system 102 may also include non-volatile read-only memory (ROM). ROM chips, which cannot be reprogrammed, are preferred to store low-level interface software programs, often referred to as firmware, that contain specific instructions to allow higher-level digital control logic software to access and control a specific piece of equipment. For example, a basic input/output system (BIOS) chip 115 used to provide low-level boot instructions to CPU 104 is occasionally provided on a ROM chip. Other memory devices, such as magnetic or optical mass storage devices 158 are optionally included in computer system 102 to store software code and data. Network memory devices, accessed via network interface 105, may also be used. Software code and data originating from non-volatile memory 108, hard disk drive or CD 158, or via network interface 105 are usually transferred to RAM 106 for faster operation of computer system 102. As computer systems are well known in the art, they are not discussed further herein.

During control of rod pump 10 by well manager 100 (FIG. 5), CPU 104 continuously scans the status of all input devices connected to input data acquisition circuitry 110, correlates the received input with control logic in memory 106, and produces the appropriate output responses needed to control pump 10 via the output control circuitry 112. As shown in FIGS. 5 and 7, typical inputs include a load cell 93 on the polished rod 32 and an inclinometer 94 on the walking beam 24, although other inputs may be used. The input circuitry 110 preferably includes one or more analog-to-digital converters (ADC) 111 to provide capability for monitoring analog electronic signals and a number of digital logic input gates 109 for receiving digital signals, thus allowing input from almost any sensor, monitor, gauge, or transducer. Sensor input to well manager 100 may be in either discrete or continuous form, or a combination of both. Discrete inputs may come from push buttons, micro switches, limit switches, photocells, proximity switches, shaft encoders, optional scales, or pressure switches, for instance. Continuous inputs may come from sources such as strain gauges, resolvers, thermocouples, transducers, resistance bridges, potentiometers, or voltmeters.

Well manager 100 examines the status of a set of inputs and, based on this status and instructions coded in digital control logic software 200, actuates or regulates a set of outputs for actuating hardware such as solenoids and variable speed motor drive circuitry. The output control circuitry 112 preferably includes one or more digital-to-analog converters (DAC) 113 for generating analog output signals and a number of digital logic output gates 114 for outputting digital signals so that well manager 100 can be connected to almost any analog or digital device in the field for control purposes. An output control line 92 for providing a control signal to regulate the speed of variable speed motor 12 is shown in FIGS. 5 and 7.

Well manager 100 may provide open-loop control, closed-loop control, or a combination of both. In open-loop control, well manager 100 issues commands to the rod pump components but has no means of assessing the results of these commands; no provision is made for feedback of information concerning movement of a controlled element, for example. In closed-loop control, also referred to as feedback control, well manager 100 outputs a command signal to a rod pump element and then compares the expected result of the command signal to the actual measured movement or location of the driven component. The difference constitutes an error signal, which is fed back to well manager 100 to adjust the command signal until no error exists. Closed loop control is generally required for use of a servomotor. The feedback devices normally used for measuring movement or location of the component are called resolvers, encoders, Inductosyn® transducers, or optical scales, and any of these, other suitable devices, or a combination thereof are used with well manager 100 as appropriate. As control systems in general, and computer-aided data acquisition and control in particular, are well known in the art, specific details are not addressed herein.

Figure 8:
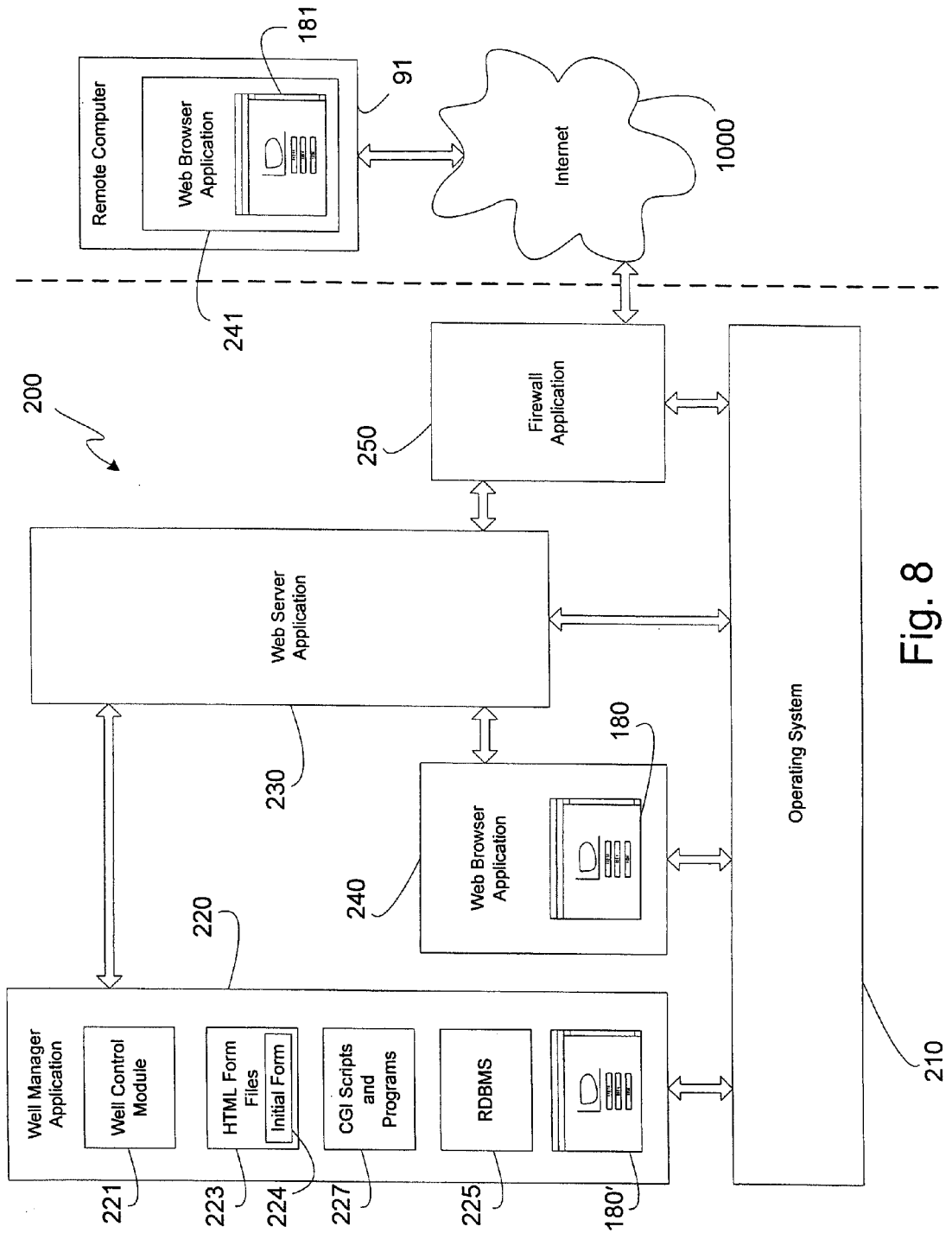
FIG. 8 is a functional schematic diagram of the software of the well manager according to an embodiment of the invention.

Well manager 100 includes computer software 200 as an integral part of the system. FIG. 5 illustrates the well manager 100. FIG. 7 is a functional block diagram of a preferred embodiment of computer system 102, and FIG. 8 is a functional block diagram of a preferred embodiment of software 200. Referring to FIGS. 5, 7 and 8 collectively, the software code 200 resides in RAM 106, non-volatile memory 108, hard disk drive, CD, or other mass storage medium 158. Additionally, the software 200 may be stored at a separate computer and accessed over the internet 1000 via network interface 105. Computer software 200 serves several purposes, including retrieving well data from the input circuitry, transforming and displaying data on computer monitors, generating reports, issuing control instructions for the rod pump, and transmitting data to a remote user over the internet. Computer software 200 includes an operating system (OS) 210, a well manager application 220, a web server application 230, an optional web browser application 240, and an optional network firewall application 250.

Operating system 210 controls computer resources, peripherals, and the execution of software applications for computer system 102. Operating system 210 is preferably an industry-standard OS such as a Linux,® Unix,® Windows,® or Macintosh® Operating System. As OS technology is commonplace and well understood in the art, operating system 210 is not discussed further herein.

Software 200 running on computer system 102 generates a local user interface 180, 180 that is displayed on monitor 120

(FIG. 6) at the well site. In a preferred embodiment, local user interface 180 is a graphical user interface (GUI) constructed of standard windows-type display and control mechanisms including windows, client windows, frames, icons, buttons, check boxes, radio buttons, scroll bars, drop-down menus, pull-down menus, folder tabs, bar graphs, panes, panels, forms, slide bars, selection boxes, dialog boxes, text boxes, list boxes, menu bars, bar graphs, wizards, et cetera. The graphical user interface is preferably constructed using an object-oriented programming language such as C++ for a Microsoft® Windows,® Linux® or Unix® OS. The graphical user interface 180 may be generated by a standard web browser application 240 such as Internet Explorer® or Netscape® running on computer system 102 that displays as a web page HyperText mark-up language (HTML) code generated concurrently by well manager application 220 and web server application 230, or alternatively, the graphical user interface 180 may be generated directly by well manager application 220 (using OS 210 resources as appropriate). In another embodiment (not illustrated), the local user interface may consist entirely of a legacy-style character and graphics display with keypad control rather than a windows-style interface. In this case, local user interface is without the use of browser application 240. As user interface and object-oriented programming are well known in the field, the details of constructing the user interfaces are not discussed further herein.

Well manager software application 220 is preferably a suite of custom software programs and files that control rod pump 10 (FIG. 5), generate a local user display 180, 180, analyze well data, provide user reports over the internet to remote users, send alarms and alerts to remote users, and accept control commands over the internet from remote users for control of the rod pump. Well manager software application 220 preferably includes a well control module 221, a family of hyperlinked HTML form files 223 disposed in a web page directory accessed by web server application 230, and a series of Common Gateway Interface (CGI) shell scripts or compiled programs 227, disposed in a cgi-bin directory, that are selectively executed in order to transform the otherwise static HTML form files 223 into a dynamic user interface when displayed in a web browser.

Well control module 221 is a custom software program that preferably provides pump-off control and production optimization capabilities such as lift optimization, automatic well testing, compressor monitoring-control, trend analysis, and pump system analysis. In rod-pumping applications, for example, proprietary optimization software, such as SROD and DIAG, is executed following each stroke of the pumping unit to determine optimum pumping speed, whether the unit should be turned off or remain running, the amount of production through the pump, the pump intake pressure, mechanical efficiencies, and opportunities for operating improvements and increased efficiencies. For example, a well manager application is described in U.S. patent application Ser. No. 10/940,273 filed on Jan. 5, 2005 by Gibbs et al., entitled "Inferred Production Rates of a Rod Pumped Well from Surface and Pump Card Information," which is incorporated herein by reference.

Well manager 100 collects tremendous amounts of rod pump data at input circuitry 110 for analysis by well manager software application 220. Well manager application 220 retrieves, stores, organizes, and processes data onsite in real time, providing reports compatible with off-the-shelf software products such as Excel,® Word,® Access,® etc. Well manager application 220 generates and makes available locally a myriad of reports from the collected data, allowing a user to query and format well data and graphically display trends with tremendous flexibility. An optional relational database application 225, such as MySQL,® may be integrated with well manager application 220 in order to simplify the handling of the large amount of collected well data. As relational databases are well known in the art, database 225 is not discussed further herein.

Software 200 includes a web sever application 230 that enables users at remote computer 91 (FIG. 5) to access well manager 100 to upload control instructions and download well data and reports. Apache is a popular open source HyperText transport protocol (HTTP) web server application that is used with Linux, Windows and other operating systems. Utilizing standard ethernet and TCP/IP networking protocols, well manager 100 is connected to the internet 1000 and assigned a static internet protocol (IP) address enabling direct inbound communication with the unit at the well site. This addressing schema eliminates the need for specialized and proprietary SCADA protocols and hardware connection methods such as direct serial communication, analog radio communication, or other polling-style communication methods. With communications managed by web server application 230, well manager 100 is accessible via the static IP address from anywhere in the world having internet access. As web server applications are commonplace and well known in the art, web server application 230 is not discussed further herein.

Well manager 100 may include a network firewall to protect it from unauthorized intrusion and computer hacking efforts. The firewall may be a firewall software application 250 executed by computer system 102, or it may be a discrete and independent hardware firewall 190 operatively coupled between network interface 105 of computer system 102 and the internet 1000. Regardless of the type of firewall installed, the firewall is preferably commercial off-the-shelf and provides controlled access to well manager 100 using multiple recognized network security methods such as user and password challenges, VPN access, filtered IP address access, et cetera. In other words, well manager 100 is secured to eliminate unauthorized access the same way that an ordinary computer is protected using existing or future common network security products. As network firewalls are well known in the art, firewall 190, 250 is not discussed further herein.

Figure 9:
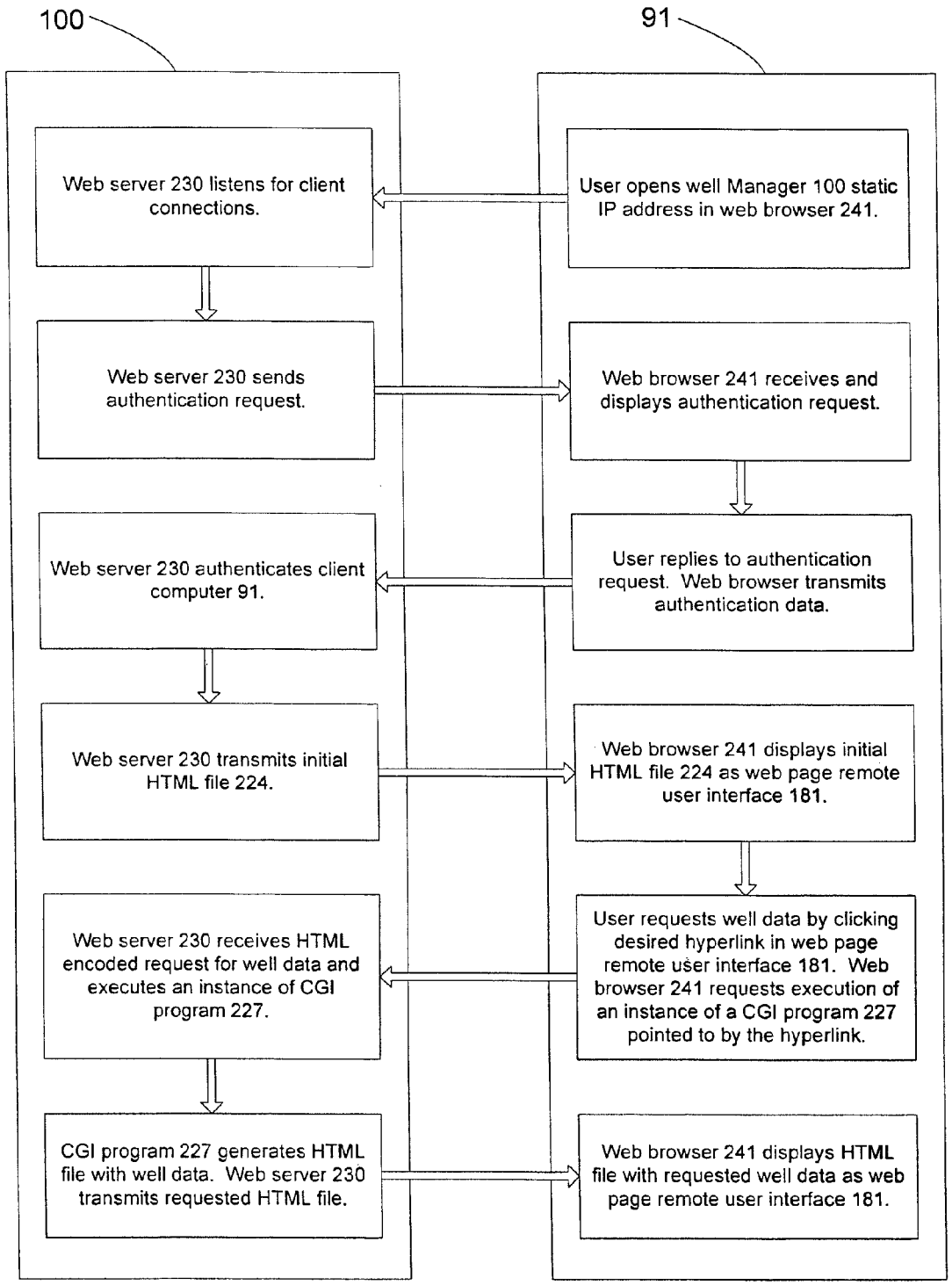
FIG. 9 is a flow chart diagram depicting typical communication between the well manager of FIGS. 5-8 and a remote client computer.

FIG. 9 is a flow chart diagram illustrating an example communication sequence between a remote user at computer 91 and well manager 100 according to one embodiment of the invention. Referring to FIGS. 8 and 9, web server application 230 and well manager application 220 cooperate to provide secure remote internet access to well manager 100. Web server 230 provides initial login access to a remote client computer 91. Once the remote client 91 is authenticated, an initial or default HTML file 224 is transmitted by web server 230 to the remote client computer. The initial HTML file 224 may include current well data and status provided by well manager application 220. In other words, the default HTML file 224 is not necessarily a static or unchanging file. The initial HTML file 224, displayed as a web page in a web browser application 241 running on remote client computer 91, forms a remote user interface 181. Web server 230 fields requests from remote users via one or more HTML web pages 223. Well manager 220 interprets each request using CGI scripts or programs 227 and selects, analyzes, sorts and codes well data in HTML format in response to the request. Web server 230 transmits the generated HTML code over the internet 1000 to remote computer 91 for display in a web browser application 241 running thereon. Thus, the remote user interface 181 display consists entirely of HTML code displayed in a browser software application running on the remote computer system 91. Additionally, due to the tremendous onboard processing power provided by computer 102, well manager 100 is capable of generating on-the-fly data processing and reports locally rather than relying on post processing of well data by a distant computer facility. These data reports, generated by well manager application in Word® or Excel® format for example, may be downloaded by remote computer 91 via web server 230 and internet 1000.

Remote computer 91 may be a personal computer, desktop computer, laptop computer, mini computer, or mainframe computer, for example, but remote computer 91 may also be a wireless personal digital assistant (PDA) such as a BlackBerry® or Palm® handheld device or cell phone that communicates with well manager 100 via a wireless internet or email connection.

Well manager 100 may additionally be programmed to "push" data to a remote user, rather than responding to a user request that "pulls" data. For instance, reports can automatically and routinely be generated and emailed to a remote user. Also, situations requiring critical decisions, alerts, and alarms may be immediately communicated in real-time to on-call operators via email, SMS text messaging, or any other standard type of internet messaging platform, eliminating the need for expensive hardware systems and constant monitoring by personnel at a SCADA control station. As internet application programming is well known in the art, details are not provided herein.

Management and access to well manager 100 for system administration is provided by the web interface built into well manager 100 and accessible via TCP/IP through a computer web browser. Well manager 100 is simply another computer node in a corporate network requiring few, if any, changes in security policies and protection methods. Administration of the network features and security of the well manager unit are thus easily managed by ordinary corporate information technology personnel as no additional protocol training or specialized knowledge is necessary to ensure successful network integration of well manager unit 100. All configuration, management and reports generated are ideally accessible directly from the web interface. Furthermore, well manager 100 is easily upgraded by uploading new software 200 or firmware 108 over the internet 1000.

As shown in FIG. 4, well manager 100 runs totally independently of managing systems or other well controllers. With direct internet access available to well manager unit 100, the need for traditional management systems and specialized hardware or software systems is eliminated That is, SCADA systems using polling-style data collection are no longer necessary. However, well manager 100 is preferably backwards compatible to allow it to work with existing legacy SCADA devices until obsolete SCADA systems are completely phased out.

Although the invention is described herein with reference to control of rod pumps, the invention is not limited as such. Rather, the invention includes an entire spectrum of artificial lift controllers having integral internet web servers such as for controlling rod pumps, progressing cavity pumps, injection wells, ESP, variable speed drives, et cetera. Nor is the invention limited to the production of hydrocarbons; the invention includes controllers with integral internet web servers for producing water, for dewatering, for gas measurement, et cetera. Finally, the invention is not limited to a stand alone controller, but includes portable diagnostic equipment with integral internet web servers and controllers with integral internet web servers that are also combined with other systems, for example.

Although the embodiments of well manager 100 described herein employ HTML and TCP/IP formats, the invention is not limited to using these formats. New communication formats and protocols may be developed over time which may replace existing formats, and well manager 100 preferably employs technologies consistent with the internet standards in use at any given time.

In summary, by providing well manager 100 with real-time, constant onsite internet communication, remote operators have access to operating data at all times. All of the well data reporting functionality of well manager 100 that is available locally is exportable over the internet to remote users. For example, reservoir engineers can monitor flood response on a minute-to-minute basis, lease operators can have periodic custom reports of the status of each well produced automatically, and technicians can determine the discharge pressure of a compressor station in a small remote field. Support costs and requirements are reduced, because no physical presence at the well is required for troubleshooting or reconfiguration of the well manager units by the operator; remote troubleshooting of the well, the pump 10, or the well manager 100 is possible over the internet 1000. The need for corrective actions can be identified sooner to minimize expensive repairs, losses in production, or pollution to the environment.

The Abstract of the disclosure is written solely for providing the United States Patent and Trademark Office and the public at large with a way by which to determine quickly from a cursory reading the nature and gist of the technical disclosure, and it represents solely a preferred embodiment and is not indicative of the nature of the invention as a whole.

While some embodiments of the invention have been illustrated in detail, the invention is not limited to the embodiments shown; modifications and adaptations of the above embodiment may occur to those skilled in the art. Such modifications and adaptations are in the spirit and scope of the invention as set forth herein:

What is claimed is:

1. An apparatus for controlling a rod pump (10), said rod pump characterized by having a rod (32) that is reciprocated by a prime mover (12), the apparatus comprising:
   a pump controller (100) coupled to and disposed near said rod pump, said controller arranged and designed to control the speed of said prime mover, to receive and record measurements of a plurality of parameters of said rod pump, and to generate an operational report therefrom; and
   a web server (102, 210, 230) integrated with said pump controller and operatively connected to an internet (1000), said web server arranged and designed to handle a request from and transmit said operational report to a remote client computer (91) via said internet.

2. The apparatus of claim 1 wherein said controller comprises:
   a computer system (102);
   data acquisition input circuitry (110) operatively coupled said computer system and a sensor (93, 94) and arranged to measure a parameter of said rod pump;
   a well manager software application (220) structured for execution by and residing on said computer system and designed and arranged to calculate a desired speed of said prime mover as a function of a measurement of said parameter; and
   control output circuitry (112) operatively coupled between said computer system and said prime mover and arranged and designed to cause said prime mover to move at said desired speed.

3. The apparatus of claim 2 wherein said controller further comprises:
  first and second sensors (93, 94) and arranged to measure a stroke position of said rod (32) and a load acting on said rod pump (10), respectively;
  said well manager software application (220) arranged to generate a downhole pump card from measurements of said first and second sensors (93, 94) and to calculate a desired speed of said prime mover (12) as a function of said downhole pump card.

4. The apparatus of claim 2 wherein said web server comprises:
  a web server software application (230) structured for execution by and residing on said computer system (102).

5. In a well produced by a pump (10) having a pump controller (100) operatively coupled to said pump for controlling the speed of said pump, the improvement comprising:
  a web server (102, 210, 230) integrated with said pump controller (100), said web server coupled to an internet (1000) and arranged and designed to allow communications between said pump controller and a remote client computer (91) via said internet.

6. A method for controlling a pump (10) having a prime mover (12), the method comprising the steps of:
  integrating a web server (102, 210, 230) with a controller (100) that is arranged and designed to control the speed of said prime mover;
  disposing said controller (100) and said web server integrated therewith near said pump (10);
  operatively coupling said web server to an internet (1000);
  measuring a parameter of said pump by said controller;
  calculating by said controller (100) a desired speed of said prime mover (12) as a function of a measurement of said parameter;
  storing in said controller said measurement as data;
  controlling the speed of said prime mover at said desired speed by said controller;
  receiving a request for a report from a remote client (91) via said internet (1000) by said controller (100); and
  transmitting said report by said controller to said remote client via said internet.

7. The method of claim 6 further comprising the step of: generating said report by said controller from said data.

8. The method of claim 7 further comprising the steps of:
  formatting said report by said controller in a hypertext markup language; and
  displaying said report by said remote client as a web page (181).

9. The method of claim 6 further comprising the step of: authenticating said remote client (91) by said controller (100).

10. The method of claim 6 wherein said pump (10) is a rod pump characterized by having a rod (32) that is reciprocated by said prime mover (12), the method further comprising the steps of:
  measuring a load of said rod pump (10) and a position of said rod (32) by said controller (100);
  generating a downhole pump card from load and position measurements by said controller;
  storing in said controller said load and position measurements as said data; and
  controlling the speed of said rod pump by said controller as a function of said downhole pump card.

11. The method of claim 6 further comprising the step of: pushing a notification of a condition of said pump to a remote user (91) over said internet (1000) by said controller (100).

12. The method of claim 6 further comprising the step of: configuring said controller (100) by a remote user (91) over said internet (1000).

13. A method for managing production of an oil reservoir produced by first and second wells having first and second pumps (10A, 10B), respectively, the method comprising the steps of:
  disposing first and second pump controllers (100A, 100B) at said first and second pumps, respectively, said first controller operatively coupled to said first pump so as to control the speed thereof, and said second controller operatively coupled to said second pump no as to control the speed thereof;
  integrating a first web server with said first controller (100A), said first web server arranged and designed for receiving a first request from a remote client (91) and transmitting a first response to said remote client via an internet (1000);
  coupling said first web server to said internet;
  integrating a second web server with said second controller (100B), said second web server arranged and designed for receiving a second request from said remote client (91) and transmitting a second response to said remote client via said internet (1000), said second controller independent of said first controller; and
  coupling said second web server to said internet.

14. The method of claim 13 further comprising the steps of:
  generating said first response by said first controller (100A) from data of said first pump (10A); and
  generating said second response by said second controller (100B) from data of said second pump (10B).

15. The method of claim 14 further comprising the steps of:
  formatting said first response by said first controller (100A) in a hypertext markup language;
  displaying said first response by said remote client (91) as a first web page (181);
  formatting said second response by said second controller (100B) in a hypertext markup language; and
  displaying said second response by said remote client (91) as a second web page.

16. The method of claim 13 further comprising the steps of:
  authenticating said remote client (91) by said first controller (100A); and
  authenticating said remote client (91) by said second controller (100B).

17. The method of claim 14 wherein said first and second pumps (10A, 10B) are first and second rod pumps, respectively, the method further comprising the steps of:
  measuring a first load of said first rod pump (10A) and a first position of a rod of said first rod pump by said first controller;
  generating a first downhole pump card from first load and position measurements by said first controller (100A);
  storing in said first controller said first load and position measurements as said first data;
  controlling the speed of said first rod pump (10A) by said first controller (100A) as a function of said first downhole pump card;
  measuring a second load of said second rod pump (10B) and a second position of a rod of said second rod pump by said second controller;
  generating a second downhole pump card from second load and position measurements by said second controller (100B);

storing in said second controller said second load and position measurements as said second data; and controlling the speed of said second rod pump (10B) by said second controller (100B) as a function of said second downhole pump card.

18. The method of claim 13 further comprising the steps of:

pushing a first notification of a first condition of said first pump (10A) to a remote user (91) over said internet (1000) by said first controller (100A); and pushing a second notification of a second condition of said second pump (10B) to said remote user (91) over said internet (1000) by said second controller (100B).

19. The method of claim 13 further comprising the steps of:

configuring said first controller (100A) by a remote user (91) over said internet (1000); and configuring said second controller (100B) by said remote user (91) over said internet (1000).

\* \* \* \* \*